United States Patent
Ko et al.

(10) Patent No.: US 8,641,201 B2
(45) Date of Patent: Feb. 4, 2014

(54) HEAT DISSIPATION MODULE AND PROJECTION APPARATUS

(75) Inventors: Tung-Yi Ko, Hsinchu (TW); Tzu-Tse Huang, Hsinchu (TW)

(73) Assignee: Coretronic Corporation, Hsin-chu (TW)

( * ) Notice: Subject to any disclaimer, the term of this patent is extended or adjusted under 35 U.S.C. 154(b) by 342 days.

(21) Appl. No.: 13/218,179

(22) Filed: Aug. 25, 2011

(65) Prior Publication Data

US 2012/0140187 A1    Jun. 7, 2012

(30) Foreign Application Priority Data

Dec. 3, 2010   (CN) .......................... 2010 1 0577855

(51) Int. Cl.
| | |
|---|---|
| *G03B 21/14* | (2006.01) |
| *G03B 21/18* | (2006.01) |
| *G03B 21/20* | (2006.01) |
| *G03B 21/26* | (2006.01) |
| *B60Q 1/06* | (2006.01) |
| *F21V 29/00* | (2006.01) |

(52) U.S. Cl.
USPC ................ 353/57; 353/87; 362/294; 362/373

(58) Field of Classification Search
USPC ......... 353/52, 57–58, 60–61, 85, 119, 70, 87, 353/122; 362/218, 264, 294, 345, 373
See application file for complete search history.

(56) References Cited

U.S. PATENT DOCUMENTS

| | | | | |
|---|---|---|---|---|
| 3,011,398 | A * | 12/1961 | Clark ............... | 353/53 |
| 6,520,647 | B2 * | 2/2003 | Raskar ............ | 353/70 |
| 7,331,677 | B2 * | 2/2008 | Horiguchi et al. .............. | 353/57 |
| 7,967,447 | B2 * | 6/2011 | Lin et al. ......... | 353/58 |
| 8,011,788 | B2 * | 9/2011 | Chang ............. | 353/52 |
| 8,408,714 | B2 * | 4/2013 | Onodera et al. ................ | 353/61 |
| 2008/0218050 | A1 | 9/2008 | Soma et al. | |
| 2008/0231812 | A1 | 9/2008 | Sakai et al. | |
| 2010/0201955 | A1 * | 8/2010 | Jougo ............. | 353/58 |
| 2011/0194080 | A1 * | 8/2011 | Hoshino et al. ................ | 353/57 |

FOREIGN PATENT DOCUMENTS

| | | |
|---|---|---|
| CN | 100385607 | 9/2005 |
| JP | 2011123095 A * | 6/2011 |
| TW | M278917 | 10/2005 |
| TW | I261858 | 9/2006 |
| TW | 201022826 | 12/2008 |
| TW | 200905365 | 1/2009 |

* cited by examiner

*Primary Examiner* — Tony Ko
*Assistant Examiner* — Jori S Reilly-Diakun
(74) *Attorney, Agent, or Firm* — Muncy, Geissler, Olds & Lowe, PLLC

(57) ABSTRACT

A heat dissipation module includes a base, a lamp, a fan, an orientation-sensing element and a motor. The lamp is disposed on the base, and the fan is disposed on the base for inducing an air flow and cooling down the lamp. The orientation-sensing element generates an orientation signal, and the motor rotates the base according to the orientation signal to allow the base to be substantially parallel to a horizontal plane. A rotational axis of the motor is substantially aligned with a central axis of the lamp.

10 Claims, 4 Drawing Sheets

HEAT DISSIPATION MODULE AND PROJECTION APPARATUS

BACKGROUND OF THE INVENTION a. Field of the Invention

The invention relates to a heat dissipation module, and, more particularly, to a heat dissipation module suitable for use in a projection apparatus.

b. Description of the Related Art

Taiwan patent publication no. 201022826 discloses a conventional heat dissipation module as shown in FIG. 4. When a lamp wick 102 emits light, mercury vapor of the lamp wick 102 rises and condenses to give out heat. Accordingly, a connecting line of a hot spot S and the center of the lamp wick 102 is substantially parallel to the direction of gravity G. Therefore, no matter where the lamp wick 102 is rotated, the connecting line of the hot spot S and the center of the lamp wick 102 is kept to be substantially parallel to the direction of gravity G. However, when a projection apparatus is inclined, the lamp wick 102, a lamp cover 104 and a fan 106 may rotate to form an angle α with respect to a horizontal plane H. In that case, as shown in FIG. 4, an air flow induced by the fan 106 and flowing through the lamp wick 102 flows in a non-parallel direction instead of a parallel direction with respect to the horizontal plane H. Therefore, the air flow is not efficiently directed to the hot spot S of the lamp wick 102, and the speed of the air flow flowing in a non-parallel direction is slower compared with a parallel manner to result in low cooling efficiency of the fan 106. The heat dissipation module 100 shown in FIG. 4 has an adjustment mechanism 108. The adjustment mechanism 108 is used to force air-guiding modules 112 and 114 to rotate about the lamp cover 104 to therefore change air-guiding angles of the air-guiding modules 112 and 114. In that case, the air flow is allowed to flow through the lamp wick 102 in a direction parallel to the horizontal plane H to achieve high cooling efficiency. However, according to the above design, the air-guiding angles of the air-guiding modules 112 and 114 are manually adjusted to result in inconvenient operations and a limited extent of adjusting effects. Further, Taiwan patent publication no. 200905365 discloses a heat dissipation module. In the heat dissipation module, when a projection apparatus is disposed on a slant, an air guiding structure is manually adjusted to enable an air flow to flow in a horizontal direction to achieve high cooling efficiency. Besides, US patent publication no. 20080231812 discloses a cooling device having two fans to cool down a lamp, and a gravity sensor is used to detect a current orientation of the projection apparatus to modulate the amount of an air flow flowing through the lamp. In addition, US patent publication no. 20080218050 discloses a design of controlling the flow direction of cooling air by rotating a movable collar. China patent no. 100385607 discloses a design of inducing an air flow by a fan and delivering the air flow to the hot spot of a lamp by pipes. Taiwan patent no. I261858 discloses a design of introducing an air flow into a lamp and exhausting hot air out of the lamp by a fan disposed back the lamp to cool down the lamp. Taiwan patent no. M278917 discloses a cooling design using two blowers. An air flow is induced by one blower to flow through a lamp wick, and an air flow is induced by the other blower to flow through a metal piece in front of the lamp wick and lead wires of the lamp.

Though the above designs may cool down the lamp to a certain extent, they are not designed to ensure the air flow induced by a fan and the air flow continually flows through the hot spot of a lamp. Therefore, the cooling efficiency fails to be further improved.

BRIEF SUMMARY OF THE INVENTION

The invention provides a heat dissipation module suitable for use in a projection apparatus. The heat dissipation module allows an air flow induced by a fan to adequately and continually flow through a hot spot of a lamp to offer high cooling efficiency.

Other objects and advantages of the invention may be further illustrated by the technical features broadly embodied and described as follows.

In order to achieve one or a portion of or all of the objects or other objects, one embodiment of the invention provides a heat dissipation module suitable for use in a projection apparatus including a base, a lamp, a fan, an orientation-sensing element and a motor. The lamp is disposed on the base, and the fan is disposed on the base for inducing an air flow and cooling down the lamp. The orientation-sensing element generates an orientation signal, and the motor rotates the base according to the orientation signal to allow the base to be substantially parallel to a horizontal plane. Further, a rotational axis of the motor is substantially aligned with a central axis of the lamp.

In one embodiment, the motor rotates the base to allow an angle between the base and the horizontal plane to be smaller than 10 degrees.

In one embodiment, the orientation-sensing element may be a gravity sensor.

In one embodiment, the orientation-sensing element is disposed on the base for detecting the orientation of the base.

In one embodiment, the hear dissipation module has a bearing disposed adjacent to a side surface of the base, and at least two pins spaced apart from each other are formed on the side surface of the base and mount to the bearing. The bearing may be attached to a housing of the projection apparatus.

In one embodiment, a central axis of the bearing is substantially aligned with the rotational axis of the motor and the central axis of the lamp.

Another embodiment of the invention provides a projection apparatus including a heat dissipation module, a light valve and a projection lens. The heat dissipation module includes a base, a lamp, a fan, an orientation-sensing element and a motor. The lamp is disposed on the base, and the fan is disposed on the base for inducing an air flow and cooling down the lamp. The orientation-sensing element generates an orientation signal, and the motor rotates the base according to the orientation signal to allow the base to be substantially parallel to a horizontal plane. A rotational axis of the motor is substantially aligned with a central axis of the lamp. The light valve is disposed on a light path of the illumination light beam for transforming the illumination light beam into an image beam, and the projection lens is disposed on a light path of the image beam.

The embodiment or the embodiments of the invention have at least one of the following advantages. According to the above embodiments, the motor is capable of automatically rotating the base according to the orientation signal to allow the base to be substantial parallel to the horizontal plane. Therefore, even the projection apparatus is obliquely disposed relative to the horizontal plane, the air flow induced by the fan is allowed to adequately and continually flow through a hot spot of the lamp to offer high cooling efficiency.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
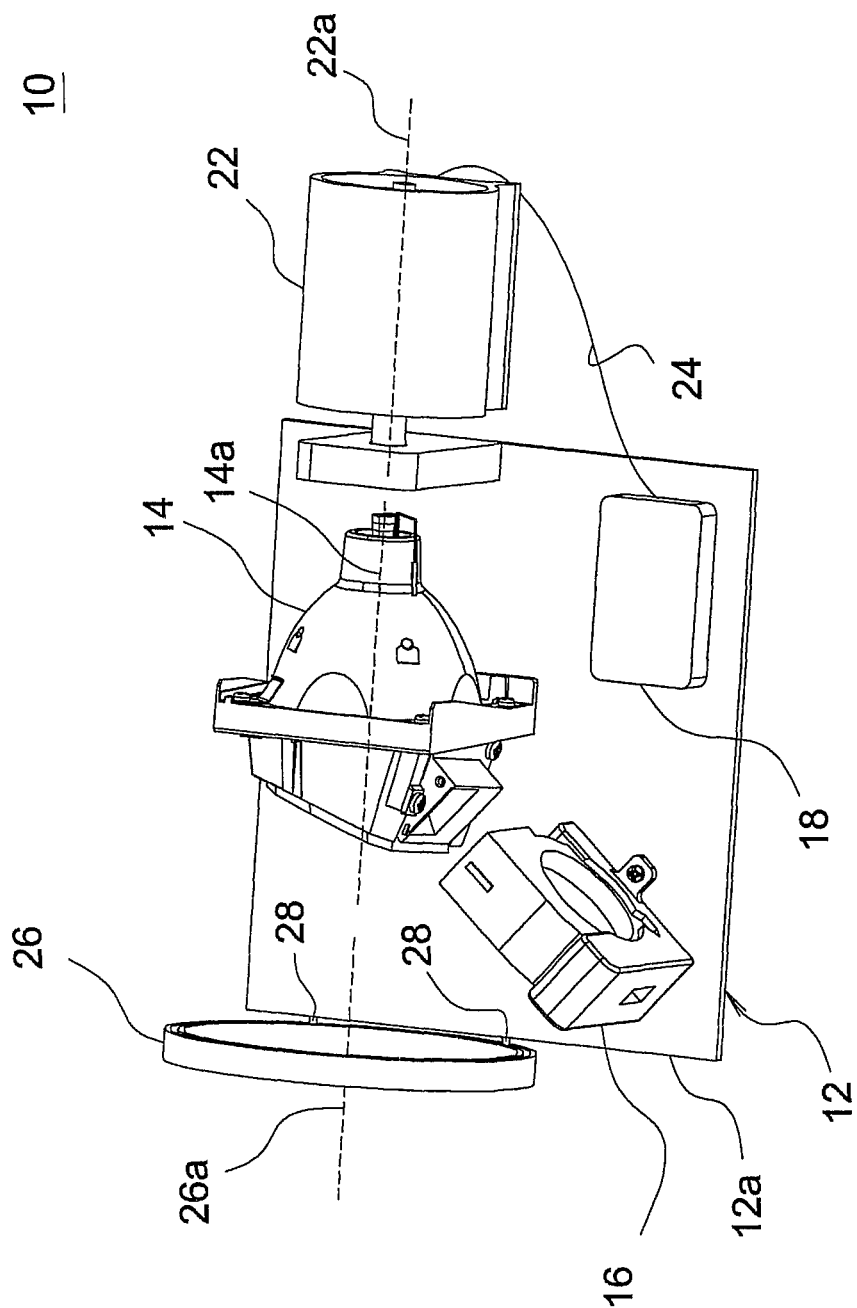
FIG. 1 shows a schematic diagram of a heat dissipation module according to an embodiment of the invention.

Referring to FIG. 1, a heat dissipation module 10 includes a base 12, a lamp 14, a fan 16, an orientation-sensing element 18 and a motor 22. The lamp 14 is disposed on the base 12, and the fan 16 is disposed on the base 12 to induce an air flow to cool down the lamp 14. The orientation-sensing element 18 detects a current orientation to generate an orientation signal, and the orientation signal is transmitted to the motor 22 through a transmission line 24. The motor 22 rotates the base 12 to a target position according to the orientation signal. For example, the orientation-sensing element 18 is a gravity sensor. In the above embodiment, the orientation-sensing element 18 is disposed on the base 12 to detect the orientation of the base 12 in space. However, the orientation-sensing element 18 is not needed to be disposed on a particular position and may be disposed on any element in connection with the base 12 (such as the fan 16 or the lamp 14).

Figure 2:
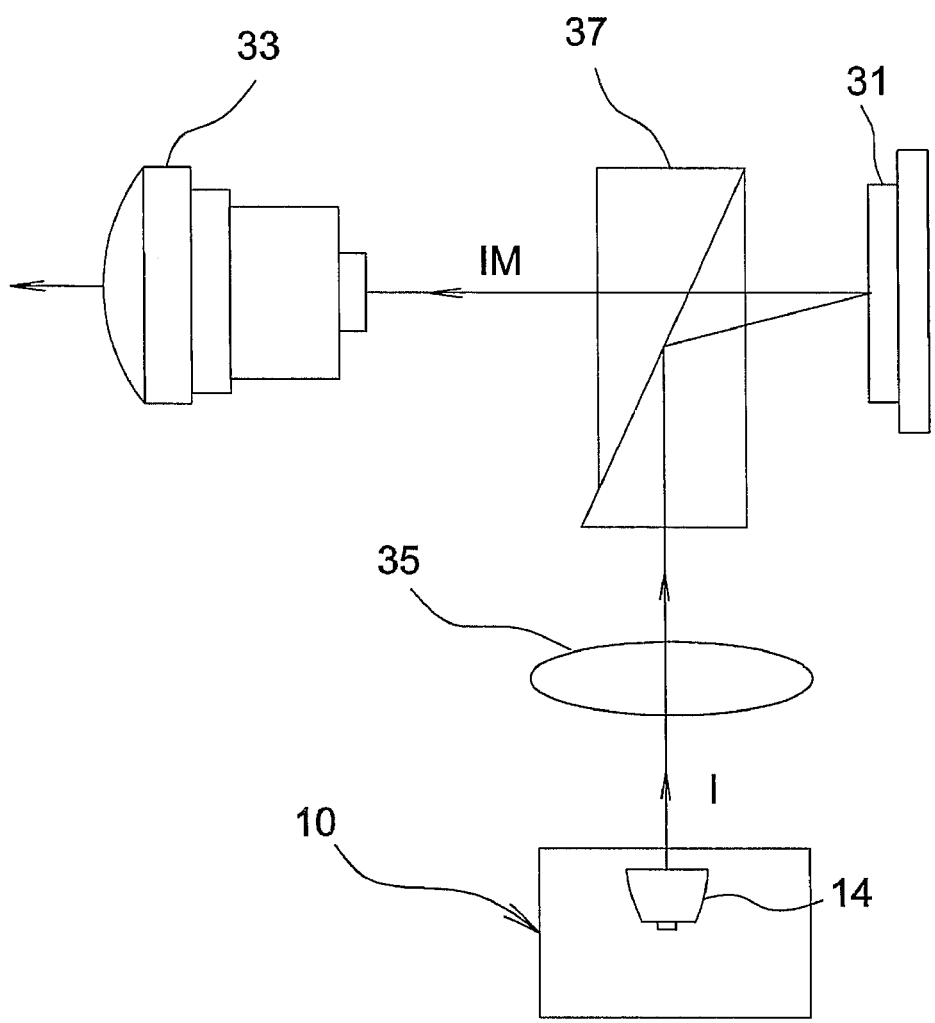
FIG. 2 shows a schematic diagram of a projection apparatus according to an embodiment of the invention.

Referring to FIG. 2, a projection apparatus 20 includes the heat dissipation module 10 shown in FIG. 1, a light valve 31 and a projection lens 33. The lamp 14 of the heat dissipation module 10 is capable of providing an illumination light beam I. The light valve 31 is disposed on a light path of the illumination light beam I for transforming the illumination light beam I into an image beam IM. The projection lens 33 is disposed on a light path of the image beam IM to project the image beam IM onto a screen (not shown). In one embodiment, the light valve 31 is a digital micro-mirror device (DMD), a reflection-type light valve such as a reflective liquid crystal on silicon panel (LCOS panel), or a transmission-type light valve such as a transmissive liquid crystal panel. Moreover, in this embodiment, the projection apparatus 20 further includes other optical components, such as a lens 35 and a total internal reflection (TIR) prism 37, disposed on the light path of the illumination light beam I and between the heat dissipation module 10 and the light valve 31.

Figure 3A:
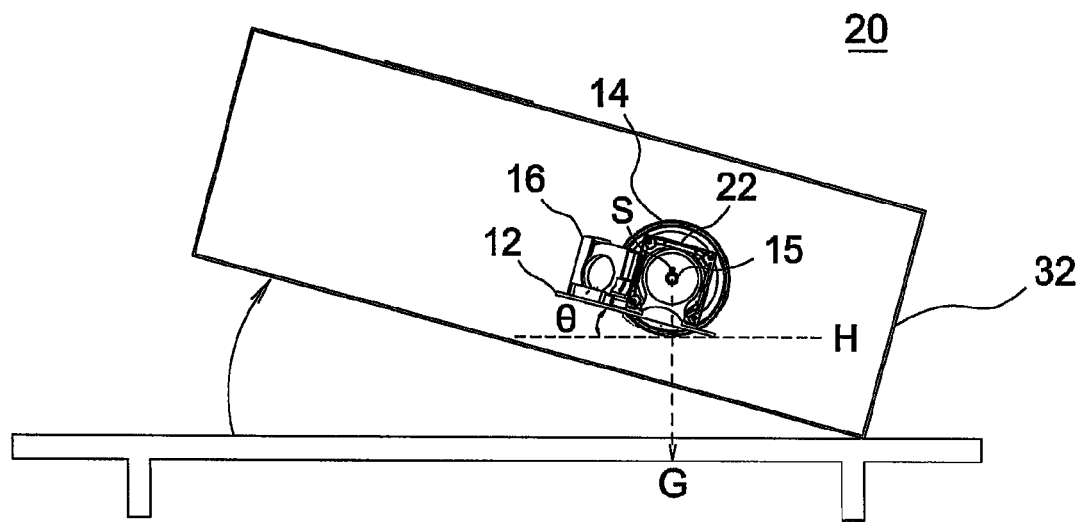
FIG. 3A and FIG. 3B show schematic diagrams illustrating cooling operations of a heat dissipation module according to an embodiment of the invention.
Figure 3B:
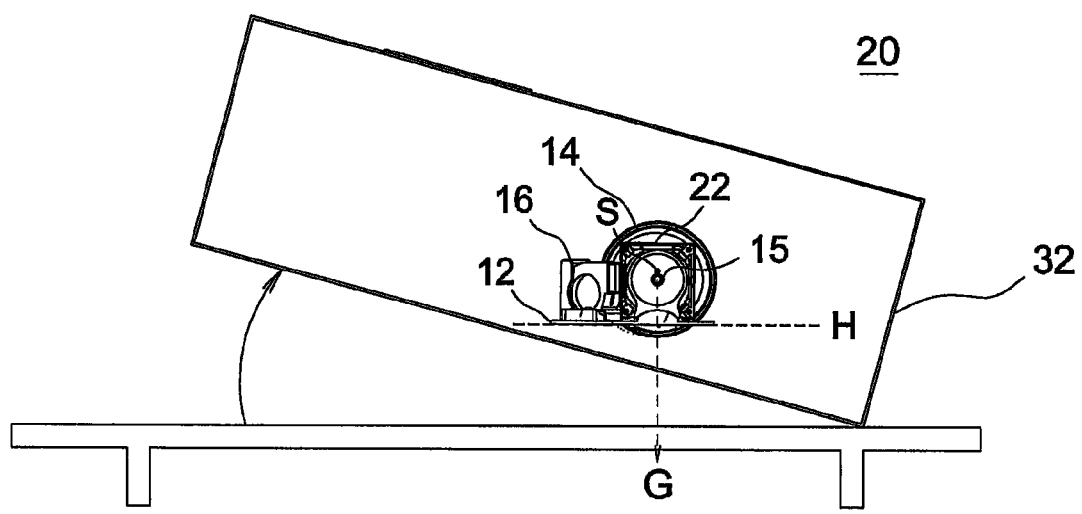
Figure 4:
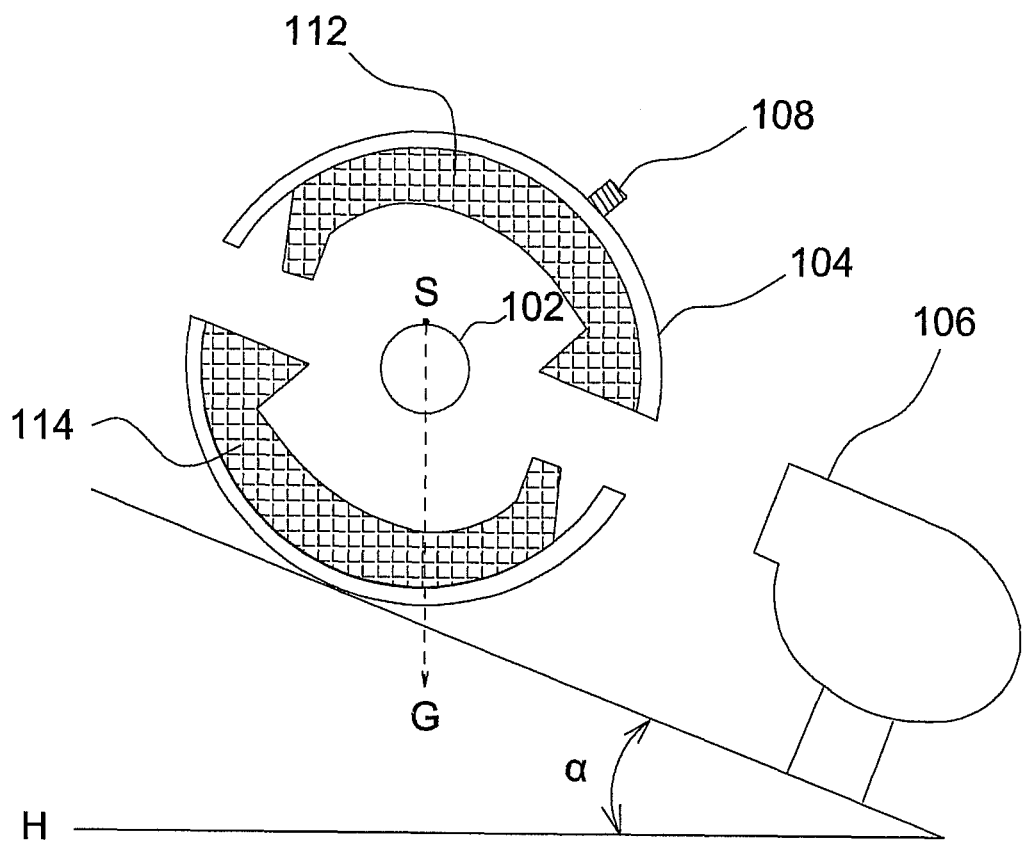
FIG. 4 shows a schematic diagram of a conventional heat dissipation module.

Referring to FIG. 3A, when the projection apparatus 20 is obliquely disposed, the base 12 forms an angle θ with respect to a horizontal plane H. The horizontal plane H is perpendicular to the direction of gravity G. Under the circumstance, a flow direction and speed of the fan 16 varies according to a current orientation relative to the angle θ between the base 12 and the horizontal plane H. Besides, since a hot spot S of the lamp 14 is located above a lamp wick 15, an air flow induced by the fan 16 fails to adequately flow through the hot spot S of the lamp 14 to result in low cooling efficiency. In this embodiment, when the base 12 forms the angle θ with respect to the horizontal plane H, the motor 22, as shown in FIG. 3B, rotates the base 12 to allow the base 12 to be substantially parallel to the horizontal plane H according to an orientation signal transmitted from the orientation-sensing element 18. Therefore, even the projection apparatus 20 is obliquely disposed relative to the horizontal plane H, the air flow induced by the fan 16 is allowed to adequately and continually flow through the hot spot S of the lamp 14 to offer high cooling efficiency. Further, in FIG. 1, a rotational axis 22a of the motor 22 is substantially aligned with a central axis 14a of the lamp 14 to avoid a shift in an irradiation direction of the lamp 14 and prevent a bad influence on a brightness performance of the projection apparatus 20. In an alternate embodiment, the motor 22 is attached to a housing 32 of the projection apparatus 20. In one embodiment, the motor 22 rotates the base 12 to allow an angle between the base 12 and the horizontal plane H to be smaller than 10 degrees for achieving the aforesaid cooling effects.

Referring to FIG. 1 again, in one embodiment, the heat dissipation module 10 further include a bearing 26, and at least two pins 28 spaced apart from each other are formed on one side surface 12a of the base 12. The bearing 26 is disposed adjacent to the side surface 12a of the base 12, and the two pins 28 are inserted into the bearing 26. Therefore, one end of the base 12 is connected with the motor 22, and the other end of the base 12 is connected with the bearing 26 so as to provide supports for the two opposite ends of the base 12. Therefore, the base 12 rotates more stably and smoothly. The bearing 26 is, for example, attached to the housing 32 of the projection apparatus 20 shown in FIGS. 3A and 3B. Further, in one embodiment, a central axis 26a of the bearing 26 is substantially aligned with the rotational axis 22a of the motor 22 and the central axis 14a of the lamp 14 to avoid possible mechanical interference during rotation.

The embodiment or the embodiments of the invention have at least one of the following advantages. According to the embodiments, the motor 22 is capable of automatically rotating the base 12 according to the orientation signal from the orientation-sensing element 18 to allow the base 12 to be substantially parallel to the horizontal plane H. Therefore, even the projection apparatus 20 is obliquely disposed relative to the horizontal plane H, the air flow induced by the fan 16 is allowed to adequately and continually flow through the hot spot S of the lamp 14 to offer high cooling efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A heat dissipation module suitable for use in a projection apparatus, comprising:
   a base;
   a lamp disposed on the base;
   a fan disposed on the base for inducing an air flow and cooling down the lamp;
   an orientation-sensing element for generating an orientation signal; and
   a motor for rotating the base according to the orientation signal to allow the base to be substantially parallel to a horizontal plane, wherein a rotational axis of the motor is substantially aligned with a central axis of the lamp.

2. The heat dissipation module as claimed in claim 1, wherein the motor is attached to a housing of the projection apparatus.

3. The heat dissipation module as claimed in claim 1, wherein the motor rotates the base to allow an angle between the base and the horizontal plane to be smaller than 10 degrees.

4. The heat dissipation module as claimed in claim 1, wherein the orientation-sensing element is a gravity sensor.

5. The heat dissipation module as claimed in claim 1, further comprising:
   a bearing disposed adjacent to a side surface of the base, wherein at least two pins are formed on the side surface of the base and mounted to the bearing.

6. The heat dissipation module as claimed in claim 5, wherein a central axis of the bearing is substantially aligned with the rotational axis of the motor.

7. The heat dissipation module as claimed in claim 5, wherein a central axis of the bearing is substantially aligned with the central axis of the lamp.

8. The heat dissipation module as claimed in claim 5, wherein the two pins are spaced apart from each other.

9. The heat dissipation module as claimed in claim 1, wherein the orientation-sensing element is disposed on the base for detecting the orientation of the base.

10. A projection apparatus, comprising:
    a heat dissipation module, comprising:
       a base;
       a lamp disposed on the base for providing an illumination light beam;
       a fan disposed on the base for inducing an air flow and cooling down the lamp;
       an orientation-sensing element for generating an orientation signal; and
       a motor for rotating the base according to the orientation signal to allow the base to be substantially parallel to a horizontal plane, wherein a rotational axis of the motor is substantially aligned with a central axis of the lamp;
    a light valve disposed on a light path of the illumination light beam for transforming the illumination light beam into an image beam; and
    a projection lens disposed on a light path of the image beam.

* * * * *